United States Patent [19]

Pettibone

[11] Patent Number: 4,616,845
[45] Date of Patent: Oct. 14, 1986

[54] TOE ADJUSTMENT APPARATUS

[75] Inventor: Craig R. Pettibone, Lafayette, Colo.

[73] Assignee: Specialty Products, Inc., Longmont, Colo.

[21] Appl. No.: 692,825

[22] Filed: Jan. 18, 1985

[51] Int. Cl.⁴ .............................................. B62D 17/00
[52] U.S. Cl. .................................... 280/661; 280/688; 72/704
[58] Field of Search ............... 280/690, 275, 698, 699, 280/700, 701, 725, 726, 661, 660, 688; 72/704

[56] References Cited

U.S. PATENT DOCUMENTS

| | | | |
|---|---|---|---|
| 1,943,721 | 1/1934 | Carpenter | 280/690 |
| 2,990,901 | 7/1961 | Chayne | 280/690 |
| 4,462,241 | 7/1984 | Whisenant | 280/661 |
| 4,462,609 | 7/1984 | Ohe | 280/690 |
| 4,493,493 | 1/1985 | Satchell et al. | 280/661 |

Primary Examiner—Richard A. Bertsch
Attorney, Agent, or Firm—Klaas & Law

[57] ABSTRACT

A toe adjustment assembly for adjusting the toe in the rear wheels of a vehicle having an independent rear suspension including: a cam device operatively associated with a lateral control arm, a slot provided in fixed relationship with the vehicle frame, and, cam engaging surfaces associated with the slot. When the cam device is rotated, it coacts with the cam engaging surfaces to cause relative lateral shifting of a shaft portion of the cam device. This lateral shifting of the cam device shaft portion causes lateral shifting of the associated control arm and thus toe adjustment of an associated wheel.

37 Claims, 12 Drawing Figures

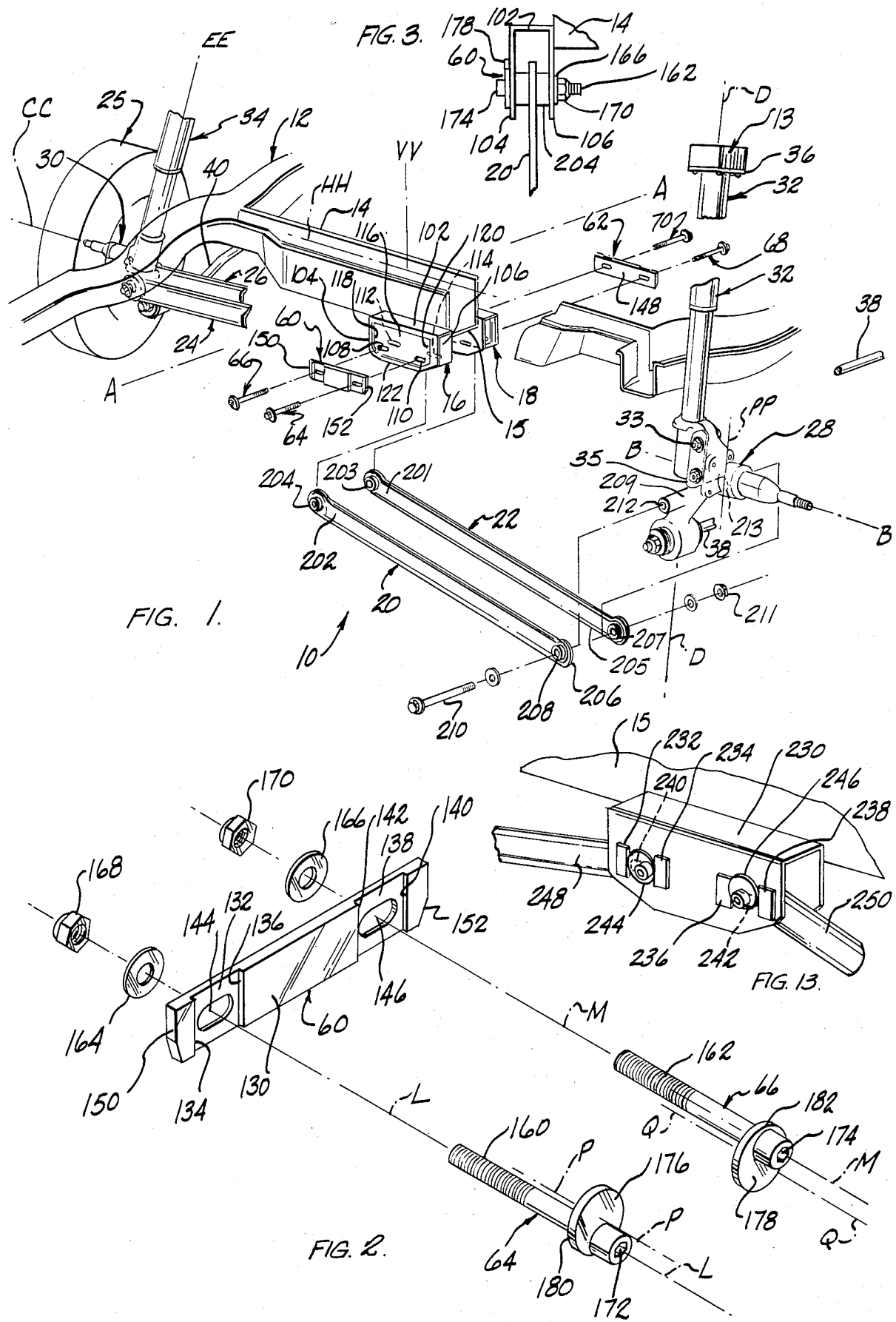

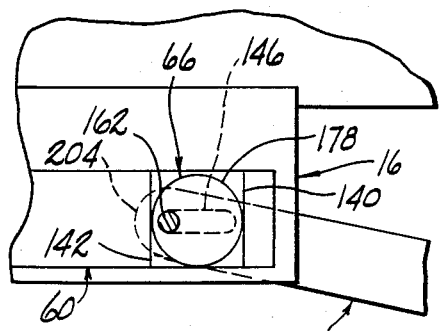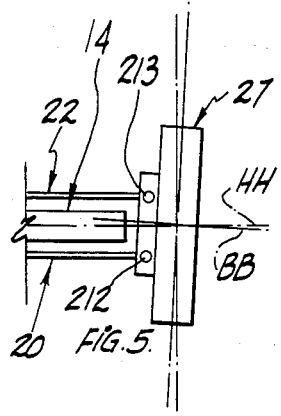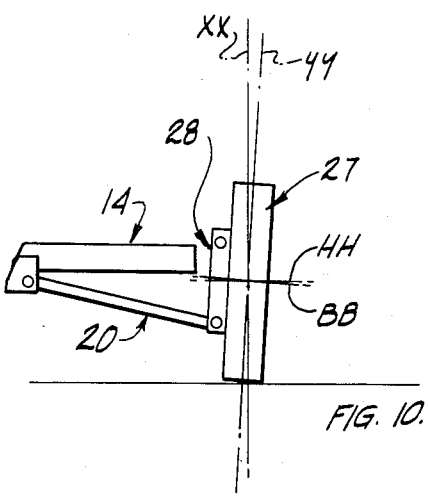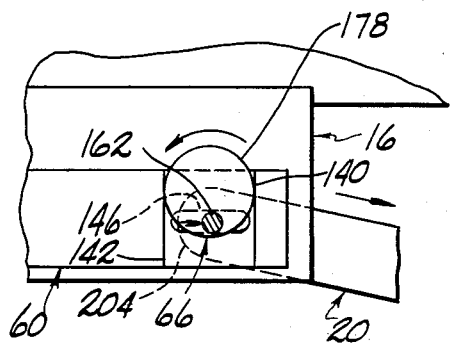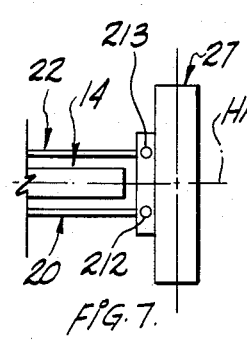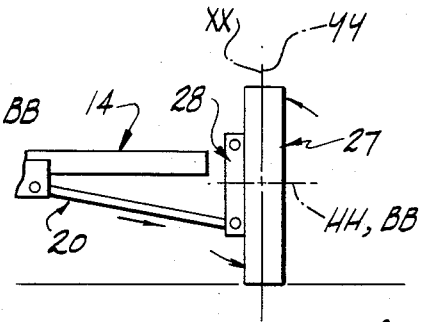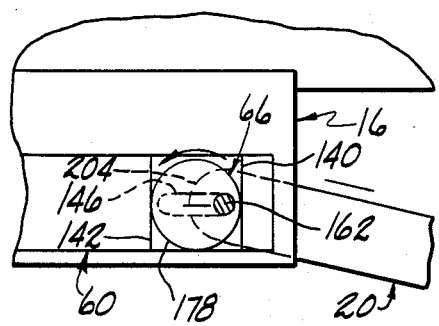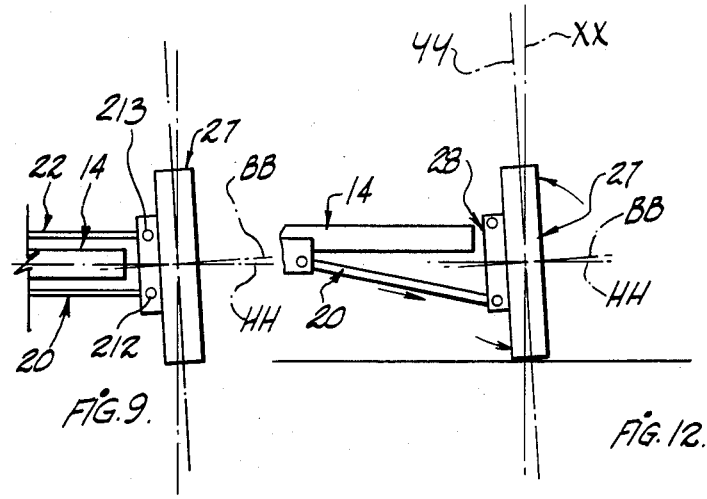

TOE ADJUSTMENT APPARATUS

BACKGROUND OF THE INVENTION

The prevent invention relates generally to automotive products and, more particularly, to an apparatus for adjusting the toe in the nonsteerable rear wheels of a vehicle having an independent rear wheel suspension system.

In a conventional independent rear suspension system for an automotive vehicle, each rear wheel is mounted independently of the other, i.e. there is no common rear axle. Each rear wheel is rotatably mounted on a wheel spindle which is, in turn, fixedly bolted to the lower end of an elongate, generally vertically extending shock strut. The upper end of the shock strut is attached to a body side panel, typically by a rubber insulated top mount assembly with attachment bolts. Due to the length and resiliency of the shock strut, the spindle and attached tire are, to a small degree, displaceable in a direction perpendicular to the longitudinal axis of the shock strut and are also torsionally (twistably) displaceable about this axis if otherwise unrestrained. In order to restrain this movement and hold the wheel in a fixed orientation with respect to the vehicle frame, a longitudinally extending restraining member, generally referred to as a tie rod, and a pair of laterally extending restraining members, generally referred to as control arms, are affixed at one end to the spindle and at an opposite end to the vehicle frame and body assembly. Due to manufacturing tolerances, etc. in the rear wheel assembly, the "toe" of a rear wheel in some cases needs adjustment. The "toe" a of wheel refers to the angle which the axis of rotation of the wheel makes with a horizontal axis extending perpendicular to the central longitudinal axis of the vehicle, i.e. the amount of angular displacement of the rotation axis from a lateral vehicle axis. When the vehicle toe is properly adjusted, the rotation axis of the wheel should generally be parallel to a lateral vehicle axis. If the front of the wheel is tilted inwardly, the wheel is "toed in". If the front of the wheel tilts outwardly, the wheel is "toed out".

Control arms, which determine the lateral position of the forward and rear portions of the spindle and thus the toe of the associated wheel, are provided with bushings at either end thereof for accepting a bolt to attach each control arm at one end to the spindle and at the other end to a central portion of the vehicle frame. The attachment hole portions in the spindle and the vehicle frame are of approximately the same diameter as the attachment bolts. The only method of adjusting the toe of a tire in such an arrangement is provided by the "slop" between the bolt receiving holes in the control arm frame and spindle and the diameter of the corresponding attachment bolts. To make toe adjustments in such an assembly, the attachment bolts at the ends of a control arm are loosened while the vehicle is supported on toe adjustment plates. Thereafter, one mechanic moves the wheel laterally to a desired toe position to the extent possible and another mechanic retightens the bolts. A problem with this solution is that due to vibration, etc. of the vehicle during ordinary use, the toe of the vehicle may shift because of lack of positive lateral restraint between the bolts, control arm and the attachment portions of the frame and spindle. Another problem with such an adjustment procedure is that only a relatively small amount of toe adjustment is possible since the amount of "slop" between the bolts and associated holes is usually relatively small. Yet another problem with such an adjustment procedure, is that it requires the service of two mechanics. Still another problem is that it is difficult to measure the toe change until after the operation is completed.

It would be generally desirable to provide a rear toe adjustment assembly enabling a single mechanic to perform an adjustment over a relatively wide range of potential toe changes in a manner which would allow the mechanic to view and measure the toe change as the adjustment is being made, and in a manner which is not subject to shifting due to ordinary vibration, etc. of the vehicle during use.

SUMMARY OF THE INVENTION

The present invention comprises a method and apparatus for adjusting the toe in a vehicle having an independent rear suspension. The toe adjustment assembly includes a cam assembly which coacts with the inwardly positioned end of a control arm, and a cam engaging surface provided at either side of an elongate laterally extending slot associated with the vehicle frame. The cam means may be adjusted by a single individual using a conventional torque applying tool, such as a conventional wrench, allen wrench or the like. The toe adjustment may be provided over a relatively large range and, due to the construction of the cam assembly, the lateral position of the control arm and thus the toe of the associated wheel, is not subject to displacement during ordinary use of the vehicle.

Thus in one embodiment, the invention comprises a rear wheel mounting and control assembly mountable on a rear portion of an automotive vehicle frame and body assembly having a central longitudinal axis and a vertical axis comprising:

(a) at least one rear wheel mounting assembly including:

(i) a shock strut means for supporting a spindle means operatively attached to the vehicle frame and body assembly and having a torsionally deflectable lower end;

(ii) a spindle means fixedly mounted at a lower end portion of said shock strut means for rotatably supporting a wheel; and (iii) a wheel rotatably mounted on said spindle means about a generally laterally extending wheel axis whereby the toe of said wheel is dependent upon the relative angular alignment of the lower end of said shock strut means and said spindle means with the vehicle central longitudinal axis;

(b) a control assembly for controlling the toe of said wheel comprising:

at least one control arm means for holding the lower end of said wheel strut means at a predetermined lateral position relative said frame and body assembly, said control arm means having a first end operatively associated with a centrally located control arm connection portion of said vehicle frame and body assembly and having a second end operatively associated with said spindle means, said control arm means extending generally transversely of said vehicle frame and body assembly central longitudinal axis; and (c) control arm adjustable lateral displacement means for adjustably displacing said control arm means laterally inwardly and outwardly whereby a portion of said spindle means is adjustably laterally displaced inwardly and outwardly whereby the toe of said wheel is adjusted inwardly and outwardly; wherein said control arm adjustable lateral displacement means comprises:

adjustable cam means associated with said control arm means;

cam engagement means fixedly associated with said vehicle frame and body assembly and coacting with said cam means; and laterally extending slot mean fixedly associated with said vehicle frame and body assembly and adapted to laterally, shiftably accept a portion of said cam means therewithin in vertically nondisplaceable relationship therewithin.

BRIEF DESCRIPTION OF THE DRAWING

FIG. 1 is an exploded perspective view of a rear wheel mounting and control assembly mounted on a rear portion of an automotive frame and body assembly.

FIG. 2 is an exploded perspective view of a cam assembly and cam engaging plate used in the control assembly of FIG. 1.

FIG. 3 is a detail, side elevation view illustrating the adjustable attachment of a control arm to a vehicle frame and body assembly using a cam assembly of the present invention.

FIG. 4 is a frontal, detailed, schematic illustration showing the operation of a toe adjustment assembly to a position causing a wheel to toe outwardly.

FIG. 5 is a schematic illustration showing the outwardly toed position of a wheel associated with the toe adjustment position of FIG. 4.

FIG. 6 is a frontal, detailed, schematic illustration showing the operation of a toe adjustment assembly to a position causing a wheel to be positioned in proper alignment.

FIG. 7 is a schematic illustration showing the properly aligned position of a wheel associated with the toe adjustment position of FIG. 6.

FIG. 8 is a frontal, detailed, schematic illustration showing the operation of a toe adjustment assembly to a position causing a wheel to toe inwardly.

FIG. 9 is a schematic illustration showing the inwardly toed position of a wheel associated with the toe adjustment position of FIG. 8.

FIG. 10 is a schematic illustration showing an outwardly cambered position of a wheel associated with a cam adjustment position shown partially in FIG. 4.

FIG. 11 is a schematic illustration showing a neutral camber position of a wheel associated with a camber adjustment position shown partially in FIG. 6.

FIG. 12 is a schematic illustration showing an inwardly cambered position of a wheel associated with a camber adjustment position shown partially in FIG. 8.

FIG. 13 is another embodiment of a cam assembly and cam engaging surfaces which may be used in a rear wheel mounting and control assembly of the general type illustrated in FIG. 1.

DETAILED DESCRIPTION OF THE INVENTION

The structure and operation of the invention will now be described in general with reference to FIG. 1. The toe adjustment assembly 10 of the present invention is provided on the rear end portion of a vehicle frame 12 and body 13 assembly, having a central longitudinal vehicle axis AA and a vertical axis VV perpendicular thereto and a horizontal, lateral axis HH perpendicular to both axes AA and VV. The frame may include a laterally extending cross member 14, having a centrally positioned connection portion 15 whereat a first bracket assembly 16 and a second bracket assembly 18 are fixedly mounted in longitudinally opposite relationship. Control arm means are provided, such as control arms 20, 22, 24, 26 for controlling the toe of rear wheels 25, 27, FIGS. 1, 5, 7, 9. In the embodiment illustrated in FIG. 1, two control arms, e.g. 20, 22, are associated with each wheel 25, 27. Wheel mounting means are provided for rotatably supporting each wheel 25, 27. In the illustrated embodiment, the wheel mounting means comprise spindle assemblies 28, 30 having generally laterally extending wheel rotation axes BB, CC. Each spindle assembly is fixedly mounted to the lower end of an associated shock strut 32, 34 as by bolts 33, 35 or other attachment means. The upper portion of each shock strut 32, 34 is fixedly attached to a body 13 side panel as by attachment bolts 36. The shock strut and attached spindle are angularly displaceable about the associated shock strut central longitudinal axis DD, EE. The shock struts are of sufficient length that the lower end of each shock strut and thus, the associated spindle assembly is displaceable to a small degree, e.g. 1 or 2 inches, in a plane perpendicular to the longitudinal axis DD, EE of an associated shock strut. A longitudinal stabilizing means may be provided to prevent movement of each shock strut and spindle in a direction parallel to the longitudinal axis AA of the vehicle. The longitudinal stabilizing means may comprise a conventional tie rod assembly 38, 40 associated with each shock strut and spindle assembly. Similarly, a control arm means 20, 22 and 24, 26 is associated with each rear shock strut and spindle to prevent movement thereof in a lateral direction and to control toe. A toe adjustment means is operatively associated with each rear wheel mounting means and control arm means and may include cam plate 60, cam bolts 64, 66 and bracket slots 108, 110, 112, 114. A toe and camber adjustment means may be provided by cam plates 60, 62, cam bolts 64, 66, 68, 70 and bracket slots 108, 110, 112, 114, etc. provided in bracket assemblies 16, 18.

In operation, a cam bolt 66 is received within a slotted portion 146 of an associated cam plate 60 and is also received within slotted portions 110, 114 of an associated bracket 116. An associated cross member 20 having an inner end portion 202 positioned between wing portions of an associated bracket 116 also receives cam bolt 66 through a connection portion, such as bushing 204, thereof. A cam disc portion 178 of the cam bolt 66 cooperates with shoulder portions of the cam plate 60 such that a shaft portion of the cam bolt is laterally translatable along the length of the slots 146, 110, 114 by rotation of the cam bolt about the axis MM of its shaft 162. The attached control arm 20 is also shifted laterally by lateral movement of the associated cam bolt 66 and causes corresponding lateral shifting in the attached portion 212 of spindle assembly 28 to provide toe adjustment to the wheel mounted thereon. In the embodiment of the invention illustrated in FIG. 1, two control arms, e.g. 20, 22 are associated with each wheel mounting means. One cam arm 22 is held stationary and provides a toe pivot axis PP at its point of attachment 213 to the spindle, while the other control arm 20 is shifted laterally to cause relative rotation of the spindle 28 about axis PP to provide toe adjustment. However, the second control arm may also be connected to the vehicle frame in laterally shiftable relationship, as shown in FIG. 1, whereby both control arms 20, 22 may be shifted laterally a similar amount to control camber as discussed in further detail below with reference to FIGS. 10-12.

Having thus described the structure and operation of the invention in general, the invention will now be described in further detail.

It may be seen with reference to FIGS. 1 and 3 that each bracket assembly 16, 18 may be identical and may comprises a generally U-shaped configuration having a horizontally disposed cross connection portion 102 and a pair of vertically disposed wing portions 104, 106. Each U-shaped bracket assembly 16, 18 extends laterally with respect to the longitudinal axis AA of the vehicle and may be fixedly attached as by welding or the like to a cross member portion 14 of the vehicle frame 12 at a laterally intermediate connection portion 15 thereof. A pair of laterally aligned, elongate, laterally extending slots 108, 110 and 112, 114 are positioned on each wing portion of a bracket assembly 16 with the slots 108, 110 on one wing portion being longitudinally aligned, respectively, with the slots 112, 114 on the other wing portion. The slots on each wing portion are positioned in a recessed portion, e.g. 116 of the associated wing 104. The recessed portion is positioned inside an outer raised peripheral ring portion 122. The interface of the recessed portion 116 and raised portion 122 define opposite, vertically extending shoulder portions 118, 120 adapted to abuttingly engage end portions 150, 152 of an associated cam plate 60 to prevent lateral movement thereof as described in further detail hereinafter.

Each bracket assembly 16, 18 may have associated therewith a cam plate 60, 62. (Alternately a single cam plate may be provided if the assembly is to be used exclusively for toe adjustment as opposed to toe and camber adjustment.) The cam plates may be of identical construction. Each cam plate comprises an outwardly facing planar surface 130, FIG. 3. Recessed from surface 130 are a pair of recessed areas 132, 138, each defining a pair of shoulder portions 134, 136, 140, 142, respectively, at the interface with surface 130. An elongate slot 144, 146 extending in the same direction a the elongate axis of the plate member, is centrally located within each recessed area 132, 138. Each plate also has a planar inwardly facing surface 148, FIG. 1, adapted to abuttingly engage the recessed portion of an associated bracket assembly. Each bracket also has a pair of terminal end surfaces 150, 152 adapted to abuttingly engage an associated bracket vertical shoulder portion 118, 120 to prevent lateral displacement of the plate 60. The slots 144, 146 provided in a plate 60, are adapted to be aligned with opposite slots 108, 112 and 110, 114 in an associated bracket 16 and may be of identical size, shape and spacing as the slots 108, 112 and 110, 114. In one presently preferred embodiment of the invention, the plate 60 may have the following dimensions. The overall length of the plate may be 5.250 inches, the vertical height of the plate (with respect to the orientation shown in FIG. 1) may be 1 inch. The length of each recessed area 132, 138 may be 1.0150 inches and each recessed area may be positioned inwardly from the outer most portion of the associated terminal end surface 150, 152 a distance of 0.4062 inches. Each terminal end surface 150 may have a generally vertically extending surface and an inwardly and downwardly bevelled surface being bevelled inwardly from a central portion of the terminal end a distance of approximately one-eighth inch. Each of the plate slots 144 146 may be centered within the associated recessed area 132, 138 and may have a total length of 0.800 inches and a vertical dimension of 0.400 inches. Each cam plate 60, 62 may be three-sixteenths inches thick and the depth of each recessed area may be three-thirtyseconds inches. Each plate is preferably constructed from a high strength material such as 1018 cooled rolled steel, and the tolerances of the slots and milled areas may be on the order of plus or minus 0.010 inches, while the tolerance of all outside areas may be on the order of plus or minus 0.015 inches.

As best illustrated in FIG. 2, each cam bolt 64, 66, etc. may comprise a shaft portion 160, 162 having a central longitudinal axis LL, MM. Each shaft portion is threaded at one end and is adapted to accept a washer 164, 166 and a threaded nut 168, 170. Each shaft portion also comprises a tool receiving portion 172, 174 at the end thereof opposite the threaded end. The tool receiving portion 172, 174 is adapted to accept a torque applying tool such as, for example, an allen wrench in the embodiment illustrated in FIG. 2, or a conventional wrench or socket and ratchet assembly or other torque applying tool. An eccentrically positioned cam disc 176, 178 is associated with each shaft portion and is fixedly mounted about the shaft portion as by welding or the like, such that the central axis PP, QQ of the disc is positioned in parallel offset alignment with the axis LL, MM of the associated shaft. Each cam disc comprises an outer cylindrical edge surface 180, 182 adapted to rotatingly abuttingly engage shoulder surface portions 134, 136 or 142, 140 of an associated recessed area 132, 138. The shaft portion 160, 162 of each cam bolt 64, 66 is only slightly smaller than the vertical dimension of an associated slot 144, 146. The diameter of each disc 176, 178 is only slightly smaller than the lateral dimension of an associated recessed area 132, 138. Thus, if a cam bolt 64 is positioned within an associated slot 144 with its associated cam disc 176 positioned in abutting relationship with the associated plate recess surface 132, then rotation of the cam bolt 64 about the longitudinal axis LL of its shaft, as with a torque tool, causes relative lateral displacement of the shaft 160 within the associated slot 144 and causes relative vertical movement of the disc 176 between associated plate shoulder surfaces 134, 136. In one preferred embodiment of the invention in which the cam bolt is adapted to cooperate with a plate having the dimensions described above, each cam bolt may comprise an overall length of approximately 2.75 inches, not including the tool attachment portion which may comprise an additional length of approximately one-quarter inch. The cam bolt shaft may be a three-eighths inch diameter threaded bolt. The cam disc 176 may have a diameter of one inch and a thickness of three-thirtyseconds inches. The disc 180 may be provided with an assymetric bore (not shown) enabling welding attachment to the shaft 160 and may have a central axis LL offset 0.16 inches from the central longitudinal axis of the threaded shaft 160. The bolt may be constructed from grade 8 alloy steel. The cam may be machined from hot rolled steel and may have an outer diameter tolerance of plus or minus 0.010 inches.

As illustrated in FIG. 1, a pair of control arms 20, 22 may be associated with each spindle 28. The two control arms 20, 22 may be of identical construction each having an inboard end portion 201, 202 having a bolt receiving portion such as a bushing 203, 204 provided therein and may also have an outboard end portion 205, 206 having a second bolt receiving portion such as bushing 207, 208 provided therein. A spindle connecting bolt 210 is adapted to be closely slidingly received within bushings 207, 208 and a spindle bolt receiving portion 209 having a first end 212 and a second end 213 abuttingly engaging control arm bushings 207, 208, respectively. Each inboard positioned bushing 203, 204 is adapted to closely accept a cam bolt 64, 68 therethrough whereby each inboard bushing 203, 204 may be positioned between opposite wing portions of an associated bracket 18, 16. The mounting of control arm 20 within bracket 16 is illustrated in detail in FIG. 3. In a conventional vehicle assembly similar to that illustrated in FIGS. 1, 2 and 3, the cam plate 60 and cam bolt 64, 66 assembly may be used to adapt the conventional vehicle suspension system for toe adjustment. A conventional vehicle suspension and control system may have a bracket similar to bracket 16 provided to support the inboard end of control arm 20, except that rather than elongate slots, circular holes are provided for connection of the control arm. Such a suspension and control assembly may be modified to provide the adjustable toe feature of the present invention by placing cam plate 60 into alignment with the bolt holes provided in the conventional bracket plate and using the cam plate 60 as a template to trace out the pattern of slots to be provided therein. Thereafter a rasp or other tool is used to laterally elongate the holes provided in the conventional bracket to provide elongate slots such as 108, 110, 112, 114 in bracket 16. By thus elongating the bracket holes, the conventional bracket has been converted into the specially adapted bracket 16 illustrated in FIG. 1, and may be used for toe adjustment in the same manner as the assembly described with respect to FIGS. 1, 2 and 3. A single plate 60 and pair of cam bolts 64, 66 may thus be used with an adapted bracket to provide toe adjustment to both rear wheels.

In another embodiment of the invention, a specially adapted U-shaped bracket 230 provided with cam engaging surfaces 232, 234, 236, 238 may be used in place of the bracket 16 and cam plate 60 assembly described above. In this embodiment, the cam disc engaging surfaces are provided at either end of elongate slots 240, 242. The cam engaging surfaces 232, 234, 236, 238 may comprise small plates or other vertical shoulder forming surfaces weldingly attached to the forward surface of the bracket 230. Cam bolts 244, 246 which may be identical to cam bolts 64, 66, are inserted through the elongate slots 240, 242, etc. of the bracket in the same manner as described above with respect to bracket 16. The cam bolts 244, 246 are also received within bushing portions (not shown) of control arms 248, 250. Cam adjustment in this embodiment is provided in the same manner as in the embodiment described above by rotation of the tool receiving portion of the cam bolt 244, 246 to cause lateral displacement of the cam bolt shaft and the associated control arm 248, 250.

Operation of the cam adjustment feature of the present invention for changing toe will now be described with reference to FIGS. 4–9.

As illustrated in FIG. 4, cam bolt 66 may be positioned in associated slot 146 of ca plate 60 and the aligned slots 110, 114 (not shown) of the associated bracket 16. At the position illustrated in FIG. 4, the cam bolt shaft 162 is positioned at the inward most portion of the associated slots 146, etc. and thus the associated bushing 204 of control arm 20 is also positioned at a laterally inwardly orientation. (The other control arm 22 is maintained in a fixed laterally centered position similar to that shown in FIG. 6) When the cam bolt 66 is in this position, the associated wheel 27, as shown in FIG. 5, has its rotation axis BB tilted forwardly from a vehicle lateral axis HH due to the relatively inwardly positioned orientation of the control arm 20 with respect to control arm 22, i.e. wheel 27 is "toe out". As illustrated in FIG. 6, when control arm 22 remains stationary and when cam bolt 66 is rotated by an appropriate torque applying tool in a counterclockwise direction, the shoulder portions 140, 142 of the cam plate and the laterally extending walls of slot 146 coact with cam disc 178 and the shaft portion 162 of cam bolt 166, respectively, causing cam disc 178 to move upwardly and the shank portion of cam bolt 66 to move laterally outwardly such that the associated wheel 27 is rotated to a "zero toe" position, i.e. a position wherein the axis of rotation BB of the wheel is coincident with a vehicle lateral axis HH, FIG. 7. In the adjustment position illustrated in FIG. 8, while control arm 22 remains fixed the cam bolt shaft portion 162 associated with control arm 20 has moved further laterally inwardly from the position illustrated in FIG. 6 by further rotation of cam bolt 66 about its longitudinal axis MM and the associated cam disc 178 has moved vertically downwardly between the associated cam engaging shoulder surfaces 140, 142. As shown by FIG. 9, with cam bolt 66 is positioned as illustrated in FIG. 8, the control arm 20 is displaced laterally outwardly relative control arm 22 thus causing the wheel rotation axis BB to be displaced rearwardly, i.e. "toed in" with respect to vehicle lateral axis HH.

It will be appreciated from viewing FIGS. 4–6, that no matter what lateral position the shaft portion 162 of cam bolt 66 may occupy, the cam disc outer peripheral edge surface 182, FIG. 2, will positively engage a shoulder surface 140 or 142 to counteract any lateral force which may be applied to the cam bolt shaft by the control arm 20. Thus the cam assembly described above will not be displaced by lateral forces which might effect the toe adjustment of a conventional control assembly. It will also be appreciated that through incremental rotation of the cam bolt with an appropriate torque applying tool, a very precise toe adjustment may be accomplished. It may be further noted that since the structure holding the control arm at a predetermined lateral position is the lateral edge surface of the cam bolt disc and associated shoulder portions of the cam plate, it is not necessary to apply excessive axial force to the abutting portions of the bracket and control arm in order to prevent slipping as is the case in some conventional toe adjustment assemblies.

Operation of the cam adjustment feature of the present invention for changing camber will now be described with reference to FIGS. 4, 6, 8, 10, 11, 12.

During camber adjustment, as opposed to toe adjustment, each pair of control arms 20, 22 which are associated with a vehicle are both moved laterally by approximately the same amount during adjustment. Thus, the associated wheel axis pivots in a vertical plane, as opposed to a horizontal plane. In describing camber adjustment below, it will be understood that the lateral shifting described for control arm 20 is also being provided in control arm 22 by similar shifting of its associated cam bolt 68.

As illustrated in FIG. 4, cam bolt 66 may be positioned in associated slot 146 of cam plate 60 and the aligned slots 110, 114 (not shown) of the associated bracket 16. At the position illustrated in FIG. 4, the cam bolt shaft 162 is positioned at the inward most portion of the associated slots 146, etc. and thus the associated bushing 204 of control arm 20 is also positioned at a laterally inwardly orientation. When the cam bolt 66 is in this position, the associated wheel 27, as shown in FIG. 10, has its central plane YY tilted outwardly from a true vertical plane XX due to the relatively inwardly positioned orientation of the control arm 20, i.e. wheel 27 is cambered outwardly. The rotation axis of the wheel BB thus extends outwardly and downwardly relative vehicle lateral axis HH. As illustrated in FIG. 6, when cam bolt 66 is rotated by an appropriate torque applying tool in a counterclockwise direction, the shoulder portions 140, 142 of the cam plate and the laterally extending walls of slot 146 coact with cam disc 178 and the shaft portion 162 of cam bolt 166, respectively, causing cam disc 178 to move upwardly and the shank portion of cam bolt 66 to move laterally outwardly such that the associated wheel 27 is rotated to a neutral camber position, i.e. a position wherein the central vertical plane YY of the wheel 27 coincides with a true vertical plane XX and the axis of rotation BB of the wheel is coincident with a lateral vehicle axis, FIG. 11. In the adjustment position illustrated in FIG. 8, the cam bolt shaft portion 162 has moved further laterally outwardly from the position illustrated in FIG. 6 by further rotation of cam bolt 66 about its longitudinal axis MM and the associated cam disc 178 has moved vertically downwardly between the associated cam engaging shoulder surfaces 140, 142. As shown by FIG. 12, with cam bolt 66 is positioned as illustrated in FIG. 8, the control arm 20 is displaced laterally outwardly thus causing the central vertical plane YY of the wheel to be displaced inwardly, i.e. cambered inwardly with respect to a true vertical plane XX and rotated axis BB is caused to extend outwardly and upwardly relative lateral vehicle axis HH. Thus by moving both control arms 20, 22 laterally through the use of a pair of cam bolts 64, 68, the camber of a wheel 27 may be quickly and accurately adjusted.

It is contemplated that the inventive concepts herein described may be variously otherwise embodied and it is intended that the appended claims be construed to include alternative embodiments of the invention except insofar as limited by the prior art.

What is claimed is:

1. A toe adjustment assembly for use in a rear wheel mounting and control assembly, provided on a rear portion of an automotive vehicle frame and body assembly, of the type having at least one rear wheel mounting assembly including a shock strut for supporting a spindle means operatively attached to the vehicle frame and body assembly; a spindle fixedly mounted at a lower end portion of the shock strut for rotatably supporting a wheel; and a wheel rotatably mounted on the spindle about a laterally extending wheel axis whereby the toe of said wheel is dependent upon the relative lateral position of a portion of said spindle; and having a control assembly for controlling the toe of the wheel including at least one control arm for holding the lower end of the wheel strut at a predetermined lateral position relative the frame and body assembly, the control arm having a first end operatively associated with a centrally located control arm connection portion of the vehicle frame and body assembly and having a second end operatively associated with a portion of the spindle, the control arm extending generally transversely of a vehicle frame and body assembly central longitudinal axis;

said toe adjustment assembly comprising:
control arm adjustable lateral displacement means for adjustably displacing the control arm laterally inwardly and outwardly whereby a laterally movable portion of the spindle is adjustably displaced inwardly and outwardly with respect to a relatively nonmoveable portion thereof whereby the toe of the wheel is adjusted inwardly and outwardly.

2. The invention of claim 1 wherein said control arm adjustable lateral displacement means comprises:
adjustable cam means associated with said control arm;
cam engagement means fixedly associated with said vehicle frame and body assembly and coacting with said cam means; and
laterally extending slot means fixedly associated with said vehicle frame and body assembly and adapted to laterally, shiftably accept a portion of said cam means therewithin in substantially nondisplaceable vertical relationship therewithin.

3. The invention of claim 2 wherein said cam means comprises:
an elongate shaft portion having a first end and a second end and a central longitudinal axis;
a circular disc portion having a central longitudinal axis and having a cylindrical periphery adapted to engage said cam engagement means, said circular disc being fixedly mounted on said elongate shaft proximate said first end thereof, said longitudinal axes of said shaft and disc being positioned in parallel, offset relationship.

4. The invention of claim 3 said shaft having a tool receiving portion at said first end thereof adapted to matingly accept a tool adapted to apply rotating torque to said shaft.

5. The invention of claim 4 said control arm comprising a shaft receiving portion at said first end thereof adapted to longitudinally, slidingly accept said shaft portion of said cam means in transversely nondisplacable relationship therewithin;
said slot means in said frame and body assembly being adapted to receive said shaft portion of said cam means in laterally shiftable vertically nondisplaceable relationship therewithin.

6. The invention of claim 5 said cam means further comprising securing means for securing said first end of said control arm to said shaft portion of said cam means and a peripheral surface portion of said slot means in substantially longitudinally nondisplaceable relationship.

7. The invention of claim 6 said securing means comprising a threaded portion on said second end of said cam shaft portion and a nut adapted to be threadingly mounted on said shaft threaded portion.

8. The invention of claim 2 said slot means comprising at least one laterally extending slot provided in a cross member portion of the vehicle frame and body assembly.

9. The invention of claim 2 wherein said slot means comprises a bracket member fixedly attached to a frame cross member portion of the vehicle frame and body assembly said bracket member having at least one laterally extending slot therein.

10. The invention of claim 3 wherein said cam engagement means comprises a pair of parallel, opposed, vertically extending surfaces separated by a distance approximately equal to the diameter of said cam circular disc said vertically extending surfaces being positioned on lateral sides of said circular disc whereby rotation of said cam means about said shaft central longitudinal axis causes relative vertical displacement of said cam means disc portion and lateral displacement of said cam means shaft portion.

11. The invention of claim 10 wherein said cam engagement means is provided on a separate plate member abuttingly engageable in nonmoving relationship with said vehicle frame and body assembly control arm connection portion by lateral stop portions fixedly associated with said frame and body assembly and by said cam means securing means, said plate member having at least one slot therein positionable opposite said slot means associated with the vehicle frame and body assembly and being substantially coextensive with said slot means.

12. A toe adjustment assembly for adjusting the toe of a rear wheel of an automotive vehicle comprising:
  (a) an elongate plate having a recessed portion therein defining two transversely extending parallel cam engaging surfaces and having a longitudinally extending slot provided in said recessed portion of substantially identical size and shape as a frame slot provided in a cross member portion of a vehicle frame, said frame slot extending laterally of the vehicle central longitudinal axis;
  (b) at least one cam assembly adapted to coact with said elongate plate, said frame slot and a vehicle control arm, said cam assembly comprising:
    (i) a shaft portion having a central longitudinal axis and being adapted to be received in laterally shiftable relationship in same cam plate slot and said frame slot and adapted to be received in laterally nonshiftable relationship in a bore portion of said vehicle control arm; said shaft portion having a torque tool engaging portion at a first end thereof and a threaded portion adapted to accept a nut at a second end thereof;
    (ii) a disc portion having a central longitudinal axis and a cylindrical periphery adapted to engage said cam engaging surfaces of said elongate plate and having a diameter slightly less than the distance between said cam engaging surfaces, said disc portion being affixed to said shaft portion proximate a first end thereof, said shaft portion passing through said disc portion; said shaft central longitudinal axis being positioned in parallel offset relationship with said disc central longitudinal axis; and
    (iii) a nut means mountable on said threaded portion for axially urging said elongate plate, an end portion of said control arm and a portion of said vehicle frame into longitudinally fixed relationship;
  (c) said elongate plate being adapted to be secured to and remain in laterally fixed relationship with said vehicle frame by said cam means; said cam means being constructed and arranged whereby said cam disc portion is displaceable in a direction parallel said cam engagement surfaces and whereby said cam shaft portion is displaceable laterally along said frame slot and said plate slot by rotation of said cam assembly about said cam shaft central longitudinal axis; said lateral displacement of said cam shaft causing lateral displacement of said control arm relative the vehicle central longitudinal axis whereby the toe of an associated rear wheel assembly is selectively adjustable.

13. A method of controlling the toe of a rear wheel in an automotive vehicle of the type having a central longitudinal axis and a vertical axis, a forward steering assembly and a pair of independently mounted, non-steerable rear wheels comprising:
  providing a laterally extending slot in a cross member portion of the vehicle frame at an intermediate portion thereof;
  providing a cam assembly having a shaft portion adaptable to be longitudinally received through said slot and being laterally slideable within said slot; said cam assembly having a disc portion mounted eccentrically near one end of said shaft;
  providing parallel cam engagement surfaces in fixed relationship with said laterally extending slot on said frame at either end of said laterally extending slot spaced at a distance approximately equal to the diameter of said cam assembly disc portion;
  mounting said cam assembly on said vehicle by passing the shaft portion thereof through said laterally extending slot and through a bushing portion of a laterally extending control arm;
  urging said control arm and said frame into abutting contact by tightening of a nut on a threaded end portion of said cam assembly shaft;
  adjusting the toe of a wheel assembly pivotally connected to a second end of the control arm by rotating the cam assembly about the central longitudinal axis of the cam assembly shaft whereby the cam assembly shaft and the control arm are shifted laterally relative the vehicle central longitudinal axis.

14. A rear wheel mounting and control assembly mountable on a rear portion of an automotive vehicle frame and body assembly having a central longitudinal axis and a vertical axis comprising:
  (a) at least one rear wheel mounting assembly including:
    (i) a shock strut means for supporting a spindle means operatively attached to the vehicle frame and body assembly at an upper end thereof and laterally displaceable relative the central longitudinal axis of the vehicle frame and body assembly at the lower end thereof;
    (ii) a spindle means fixedly mounted at a lower end portion of said shock strut means for rotatably supporting a wheel; and
    (iii) a wheel rotatably mounted on said spindle means about a laterally extending wheel axis whereby the camber of said wheel is dependent upon the relative lateral position of the lower end of said shock strut means;
  (b) a control assembly for controlling the camber of said wheel comprising:
  at least one control arm means for holding the lower end of said wheel strut means at a predetermined lateral position relative said frame and body assembly, said control arm means having a first end operatively associated with a centrally located control arm connection portion of said vehicle frame and body assembly and having a second end operatively associated with said spindle means, said control arm means extending generally transversely of said vehicle frame and body assembly central longitudinal axis; and
  (c) control arm adjustable lateral displacement means for adjustably displacing said control arm means laterally inwardly and outwardly whereby said lower end of said shock strut means and said spindle means are adjustably displaced inwardly and outwardly whereby the camber of said wheel is adjusted inwardly and outwardly.

15. The invention of claim 14 wherein said control arm adjustable lateral displacement means comprises:
  adjustable cam means associated with said control arm means;
  cam engagement means fixedly associated with said vehicle frame and body assembly and coacting with said cam means; and
  laterally extending slot means fixedly associated with said vehicle frame and body assembly and adapted to laterally, shiftably accept a portion of said cam means therewithin in substantially nondisplaceable vertical relationship therewithin.

16. The invention of claim 15 wherein said cam means comprises:
  an elongate shaft portion having a first end and a second end and a central longitudinal axis;
  a circular disc portion having a central longitudinal axis and having a cylindrical periphery adapted to engage said cam engagement means, said circular disc being fixedly mounted on said elongate shaft proximate said first end thereof, said longitudinal axes of said shaft and disc being positioned in parallel, offset relationship.

17. The invention of claim 16 said shaft having a tool receiving portion at said first end thereof adapted to matingly accept a tool adapted to apply rotating torque to said shaft.

18. The invention of claim 17 said control arm means comprising a shaft receiving portion at said first end thereof adapted to longitudinally, slidingly accept said shaft portion of said cam means in transversely nondisplacable relationship therewithin;
  said slot means in said frame and body assembly being adapted to receive said shaft portion of said cam means in laterally shiftable vertically nondisplaceable relationship therewithin.

19. The invention of claim 18 said cam means further comprising securing means for securing said first end of said control arm means said shaft portion of said cam means and a peripheral surface portion of said slot means in.

20. The invention of claim 19 said securing means comprising a threaded portion on said second end of said cam shaft portion and a nut adapted to be threadingly mounted on said shaft threaded portion.

21. The invention of claim 15 said slot means comprising at least one laterally extending slot provided in a cross member portion of the vehicle frame and body assembly.

22. The invention of claim 15 wherein said slot means comprises a bracket member fixedly attached to a frame cross member portion of the vehicle frame and body assembly said bracket member having at least one laterally extending slot therein.

23. The invention of claim 16 wherein said cam engagement means comprises a pair of parallel, opposed, vertically extending surfaces separated by a distance approximately equal to the diameter of said cam circular disc said vertically extending surfaces being positioned on lateral sides of said cam circular disc whereby rotation of said cam means about said shaft central longitudinal axis causes relative vertical displacement of said cam means disc portion and lateral displacement of said cam means shaft portion.

24. The invention of claim 23 wherein said cam engagement means is provided on a separate plate member abuttingly engageable in nonmoving relationship with said vehicle frame and body assembly control arm connection portion by by lateral stop portions fixedly associated with said frame and body assembly and said cam means securing means, said plate member having at least one slot therein positionable opposite said slot means associated with the vehicle frame and body assembly substantially coextensive with said slot means.

25. A camber adjustment assembly for use in a rear wheel mounting and control assembly, provided on a rear portion of an automotive vehicle frame and body assembly, of the type having at least one rear wheel mounting assembly including a shock strut for supporting a spindle means operatively attached to the vehicle frame and body assembly; a spindle fixedly mounted at a lower end portion of the shock strut for rotatably supporting a wheel; and a wheel rotatably mounted on the spindle about a laterally extending wheel axis whereby the camber of said wheel is dependent upon the relative lateral position of the lower end of the shock strut means; and having a control assembly for controlling the camber of the wheel including at least one control arm for holding the lower end of the wheel strut at a predetermined lateral position relative the frame and body assembly, the control arm having a first end operatively associated with a centrally located control arm connection portion of the vehicle frame and body assembly and having a second end operatively associated with the spindle, the control arm extending generally transversely of a vehicle frame and body assembly central longitudinal axis;
  said camber adjustment assembly comprising:
    control arm adjustable lateral displacement means for adjustably displacing the control arm laterally inwardly and outwarcly whereby the lower end of the shock strut and the spindle are adjustably displaced inwardly and outwardly whereby the camber of the wheel is adjusted inwardly and outwardly.

26. The invention of claim 25 wherein said control arm adjustable lateral displacement means comprises:
  adjustable cam means associated with said control arm;
  cam engagement means fixedly associated with said vehicle frame and body assembly and coacting with said cam means; and
  laterally extending slot means fixedly associated with said vehicle frame and body assembly and adapted to laterally, shiftably accept a portion of said cam means therewithin in substantially nondisplaceable vertical relationship therewithin.

27. The invention of claim 26 wherein said cam means comprises:
  an elongate shaft portion having a first end and a second end and a central longitudinal axis;
  a circular disc portion having a central longitudinal axis and having a cylindrical periphery adapted to engage said cam engagement means, said circular disc being fixedly mounted on said elongate shaft proximate said first end thereof, said longitudinal axes of said shaft and disc being positioned in parallel, offset relationship.

28. The invention of claim 27 said shaft having a tool receiving portion at said first end thereof adapted to matingly accept a tool adapted to apply rotating torque to said shaft.

29. The invention of claim 28 said control arm comprising a shaft receiving portion at said first end thereof adapted to longitudinally, slidingly accept said shaft portion of said cam means in transversely nondisplacable relationship therewithin;

said slot means in said frame and body assembly being adapted to receive said shaft portion of said cam means in laterally shiftable vertically nondisplaceable relationship therewithin.

30. The invention of claim 29 said cam means further comprising securing means for securing said first end of said control arm said shaft portion of said cam means and a peripheral surface portion of said slot means in substantially longitudinally nondisplaceable relationship.

31. The invention of claim 30 said securing means comprising a threaded portion on said second end of said cam shaft portion and a nut adapted to be threadingly mounted on said shaft threaded portion.

32. The invention of claim 26 said slot means comprising at least one laterally extending slot provided in a cross member portion of the vehicle frame and body assembly.

33. The invention of claim 26 wherein said slot means comprises a bracket member fixedly attached to a frame cross member portion of the vehicle frame and body assembly said bracket member having at least one laterally extending slot therein.

34. The invention of claim 27 wherein said cam engagement means comprises a pair of parallel, opposed, vertically extending surfaces separated by a distance approximately equal to the diameter of said cam circular disc said vertically extending surfaces being positioned on lateral sides of said circular disc whereby rotation of said cam means about said shaft central longitudinal axis causes relative vertical displacement of said cam means disc portion and lateral displacement of said cam means shaft portion.

35. The invention of claim 34 wherein said cam engagement means is provided on a separate plate member abuttingly engageable in nonmoving relationship with said vehicle frame and body assembly control arm connection portion by lateral stop portions fixedly associated with said frame and body assembly and by said cam means securing means, said plate member having at least one slot therein positionable opposite said slot means associated with the vehicle frame and body assembly and being substantially coextensive with said slot means.

36. A camber adjustment assembly for adjusting the camber of a rear wheel of an automotive vehicle comprising:
 (a) an elongate plate having a recessed portion therein defining two transversely extending parallel cam engaging surfaces and having a longitudinally extending slot provided in said recessed portion of substantially identical size and shape as a frame slot provided in a cross member portion of a vehicle frame, said frame slot extending laterally of the vehicle central longitudinal axis;
 (b) at least one cam assembly adapted to coact with said elongate plate, said frame slot and a vehicle control arm, said cam assembly comprising:
  (i) a shaft portion having a central longitudinal axis and being adapted to be received in laterally shiftable relationship in said cam plate slot and said frame slot and adapted to be received in laterally nonshiftable relationship in a bore portion of said vehicle control arm; said shaft portion having a torque tool engaging portion at a first end thereof and a threaded portion adapted to accept a nut at a second end thereof;
  (ii) a disc portion having a central longitudinal axis and a cylindrical periphery adapted to engage said cam engaging surfaces of said elongate plate and having a diameter slightly less than the distance between said cam engaging surfaces, said disc portion being affixed to said shaft portion proximate a first end thereof, said shaft portion passing through said disc portion; said shaft central longitudinal axis being positioned in parallel offset relationship with said disc central longitudinal axis; and
  (iii) a nut means mountable on said threaded portion for axially urging said elongate plate, an end portion of said control arm and a portion of said vehicle frame into longitudinally fixed relationship;
 (c) said elongate plate being adapted to be secured to and remain in laterally fixed relationship with said vehicle frame by said cam means; said cam means being constructed and arranged whereby said cam disc portion is displaceable in a direction parallel said cam engagement surfaces and whereby said cam shaft portion is displaceable laterally along said frame slot and said plate slot by rotation of said cam assembly about said cam shaft central longitudinal axis; said lateral displacement of said cam shaft causing lateral displacement of said control arm relative the vehicle central longitudinal axis whereby the camber of an associated rear wheel assembly is selectively adjustable.

37. A method of controlling the camber of a rear wheel in an automotive vehicle of the type having a central longitudinal axis and a vertical axis, a forward steering assembly and a pair of independently mounted, nonsteerable rear wheels comprising:

providing a laterally extending slot in a cross member portion of the vehicle frame at an intermediate portion thereof;

providing a cam assembly having a shaft portion adaptable to be longitudinally received through said slot and being laterally slideable within said slot; said cam assembly having a disc portion mounted eccentrically near one end of said shaft;

providing parallel cam engagement surfaces in fixed relationship with said laterally extending slot on said frame at either end of said laterally extending slot spaced at a distance approximately equal to the diameter of said cam assembly disc portion;

mounting said cam assembly on said vehicle by passing the shaft portion thereof through said laterally extending slot and through a bushing portion of a laterally extending control arm;

urging said control arm and said frame into abutting contact by tightening of a nut on a threaded end portion of said cam assembly shaft;

adjusting the camber of a wheel assembly pivotally connected to a second end of the control arm by rotating the cam assembly about the central longitudinal axis of the cam assembly shaft whereby the cam assembly shaft and the control arm are shifted laterally relative the vehicle control longitudinal axis.

* * * * *